United States Patent
Moon et al.

(10) Patent No.: US 12,289,815 B2
(45) Date of Patent: Apr. 29, 2025

(54) COOKING APPARATUS

(71) Applicant: LG Electronics Inc., Seoul (KR)

(72) Inventors: Hyunwook Moon, Seoul (KR); Eui Sung Kim, Seoul (KR); Dooyong Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 369 days.

(21) Appl. No.: 16/768,528

(22) PCT Filed: Jan. 9, 2019

(86) PCT No.: PCT/KR2019/000357
§ 371 (c)(1),
(2) Date: May 29, 2020

(87) PCT Pub. No.: WO2019/156371
PCT Pub. Date: Aug. 15, 2019

(65) Prior Publication Data
US 2021/0195698 A1    Jun. 24, 2021

(30) Foreign Application Priority Data

Feb. 8, 2018    (KR) .......................... 10-2018-0015455

(51) Int. Cl.
*H05B 6/06* (2006.01)
*H05B 6/12* (2006.01)

(52) U.S. Cl.
CPC ........... *H05B 6/062* (2013.01); *H05B 6/1236* (2013.01); *H05B 6/1245* (2013.01); *H05B 2213/06* (2013.01)

(58) Field of Classification Search
CPC .. H05B 6/062; H05B 6/1236; H05B 2213/06; H05B 6/1245; H05B 6/065; H05B 6/04; H05B 6/12; H05B 6/1272
(Continued)

(56) References Cited

U.S. PATENT DOCUMENTS 5,296,684 A * 3/1994 Essig ..................... H05B 3/746
219/447.1
9,955,529 B2 * 4/2018 Baarman ................ A47J 27/004
(Continued)

FOREIGN PATENT DOCUMENTS

ES        2273595        5/2007
ES        2273595 A1 *   5/2007   ............. G01B 7/004
(Continued)

OTHER PUBLICATIONS

Machine translation of JP-2006230516: Hamada, Built-in Kitchen, 2006 (Year: 2006).*
(Continued)

*Primary Examiner* — Chris Q Liu
*Assistant Examiner* — Abigail H Rhue
(74) *Attorney, Agent, or Firm* — Fish & Richardson P.C.

(57) ABSTRACT

A cooking apparatus includes an upper plate configured to support a cooking vessel, a heating module that is movably disposed in a space under the upper plate and that includes a coil, a substrate that is disposed between the upper plate and the heating module and that includes a plurality of coil patterns, an inverter configured to supply a resonance current to each of the plurality of coil patterns, and a controller configured to control the heating module, the substrate, and the inverter. The controller determines a position of the cooking vessel on the upper plate based on the number or a frequency of pulses of resonance current supplied to each of the plurality of coil patterns. The cooking apparatus recognizes the position of the cooking vessel disposed on the cooking apparatus and moves the heating module to the recognized position.

20 Claims, 6 Drawing Sheets (58) Field of Classification Search
USPC ....... 219/622, 626, 647, 624, 661, 662, 663, 219/664, 668
See application file for complete search history.

(56) References Cited

U.S. PATENT DOCUMENTS

| | | |
|---|---|---|
| 2009/0096413 A1 | 4/2009 | Partovi et al. |
| 2010/0147832 A1* | 6/2010 | Barker, III ............ H05B 6/062 219/626 |
| 2010/0315038 A1 | 12/2010 | Terao et al. |
| 2012/0256585 A1 | 10/2012 | Partovi et al. |
| 2013/0175983 A1 | 7/2013 | Partovi et al. |
| 2014/0176068 A1 | 6/2014 | Nishikawa |
| 2015/0145475 A1 | 5/2015 | Partovi et al. |
| 2016/0181860 A1 | 6/2016 | Partovi et al. |
| 2017/0194809 A1 | 7/2017 | Partovi et al. |
| 2018/0301933 A1 | 10/2018 | Lee et al. |

FOREIGN PATENT DOCUMENTS

| | | | |
|---|---|---|---|
| ES | 2376566 | 3/2012 | |
| JP | 2006230516 | 9/2006 | |
| JP | 2006230516 A * | 9/2006 | ............ F24C 15/103 |
| JP | 2009011400 | 1/2009 | |
| JP | 2016039643 | 3/2016 | |
| JP | 2016039643 A * | 3/2016 | |
| KR | 101462093 B1 * | 11/2014 | |
| KR | 20170054708 | 5/2017 | |
| KR | 20170127097 | 11/2017 | |
| WO | WO2008137996 | 11/2008 | |

OTHER PUBLICATIONS

Machine translation of JP2016039643: Kanno, Transmission equipment and wireless power transmission system, 2016 (Year: 2016).*

Machine translation of ES2273595: Garcia, Device with a sensor system to determine the position of a metallic object, 2007 (Year: 2007).*

Machine translation of KR-101462093: Song, Electric Range with Oven Detection Function, 2014 (Year: 2014).*

Extended European Search Report in European Appln. No. 19750502.7, dated Oct. 6, 2021, 7 pages.

* cited by examiner

FIG. 6

COOKING APPARATUS

CROSS-REFERENCE TO RELATED APPLICATIONS

This application is a National Stage application under 35 U.S.C. § 371 of International Application No. PCT/KR2019/000357, filed on Jan. 9, 2019, which claims the benefit of Korean Patent Application No. 10-2018-0015455, filed on Feb. 8, 2018. The disclosures of the prior applications are incorporated by reference in their entirety.

TECHNICAL FIELD

The present disclosure relates to a cooking apparatus, and, particularly, to a cooking apparatus that can change a position of a heating module for heating a cooking vessel.

BACKGROUND

Cooking apparatuses may heat food using electricity or other energy sources (e.g., gas) at homes or in indoor spaces.

The cooking apparatuses may be classified as a cooking apparatus such as a gas range, a gas oven, a gas oven range, and the like that use gas as a heat source, a cooking apparatus such as an induction range that uses electricity as a heat source, an electric range using a radiant heater, a microwave oven, and the like. In some case, a cooking apparatus may include an induction range using electricity and a gas oven using gas that are combined.

An induction range may use induction heating (IH). Induction heating involves a technology of enabling induced current to flow without directly contacting an object subject to heating. For example, induction heating may include a technology or method for generating heat in a cooking vessel disposed in a magnetic field space having a magnetic field formed around a coil when electric current is supplied to the coil. In the induction heating, the cooking vessel may be made of a material to which a magnet is attached (e.g., a metallic material to which a magnet is attached).

In some cases, a cooking apparatus may include a coil for heating a cooking vessel at a predetermined position of the cooking apparatus.

SUMMARY

The present disclosure describes a cooking apparatus that may heat a cooking vessel even when the cooking vessel is disposed at any position on the cooking apparatus.

The present disclosure also describes a cooking apparatus that may accurately recognize a position of a cooking vessel disposed on the cooking apparatus.

The present disclosure further describes a cooking apparatus that may move a heating module disposed at a lower side of the cooking vessel based on the recognized position of the cooking vessel.

The present disclosure describes a cooking apparatus that may supply electric current stably to the heating module without interruption of supply of current or disconnection of current even when the heating module provided at the cooking apparatus is moved.

In some implementations, the cooking apparatus may recognize a position of a cooking vessel disposed on an upper plate of the cooking apparatus and may automatically move a heating module to a position corresponding to a lower side of the cooking vessel.

According to one aspect of the subject matter described in this application, a cooking apparatus includes an upper plate configured to support a cooking vessel, a heating module that is disposed in a lower space defined vertically below the upper plate and that is configured to move in the lower space relative to the upper plate, the heating module including a coil, a substrate disposed between the upper plate and the heating module, the substrate including a plurality of coil patterns, an inverter configured to supply resonance current to each of the plurality of coil patterns, and a controller. The controller is configured to control the heating module, the plurality of coil patterns, and the inverter, and determine a position of the cooking vessel on the upper plate based on a number of pulses of the resonance current supplied to each of the plurality of coil patterns or a frequency of the resonance current.

Implementations according to this aspect may include one or more of the following features. For example, the substrate may cover an upper end of the lower space. In some examples, the plurality of coil patterns are disposed on the substrate, spaced apart from one another by predetermined intervals, and arranged along a plurality of rows and a plurality of columns. In some examples, the controller may be configured to control the inverter to repeatedly supply a pulse to each of the plurality of coil patterns based on a predetermined cycle until the position of the cooking vessel is determined.

In some implementations, the cooking apparatus may further include a plurality of sensors, each of the plurality of sensors being connected to one of the plurality of coil patterns and configured to detect the number of pulses and the frequency of the resonance current supplied to the one of the plurality of coil patterns. In some examples, the controller may be configured to electrically connect to each of the plurality of sensors and receive pulse information including the number of the pulses and the frequency of the resonance current supplied to each of the plurality of sensors, and based on the pulse information, determine a target coil pattern corresponding to the position of the cooking vessel among the plurality of coil patterns.

In some implementations, the controller may be configured to receive target position information corresponding to a position of the target coil pattern from a non-transitory memory device, the non-transitory memory device being configured to store position information corresponding to each of the plurality of coil patterns, and determine the position of the cooking vessel based on the target position information.

In some implementations, the controller may be configured to, based on the cooking vessel overlapping with a first area on the upper plate corresponding to a first target coil pattern among the plurality of coil patterns and a second area on the upper plate corresponding to a second target coil pattern among the plurality of coil patterns, determine the position of the cooking vessel based on a difference in the number of the pulses or the frequency of the resonance current supplied to the first target coil pattern and the second target coil pattern. The first area is greater than the second area.

In some implementations, the controller is configured to determine that no cooking vessel is disposed on the upper plate based on (i) the number of pulses detected by each of the plurality of sensors being greater than a first reference number and (ii) the frequency of the resonance current corresponding to a first reference frequency. In some examples, the controller may be configured to, based on a number of pulses supplied to a coil pattern among the plurality of coil patterns being between the first reference number and a second reference number that is less than the first reference number, determine the coil pattern as the second target coil pattern, and based on the number of pulses supplied to the coil pattern being less than the second reference number, determine the coil pattern as the first target coil pattern.

In some implementations, the controller may be configured to, based on a frequency of resonance current supplied to a coil pattern among the plurality of coil patterns being between the first reference frequency and a second reference frequency that is less than the first reference frequency, determine the coil pattern as the second target coil pattern, and based on the frequency of the resonance current supplied to the coil pattern being less than the second reference frequency, determine the coil pattern as the first target coil pattern.

In some implementations, the controller may be configured to move the heating module to a lower side of the cooking vessel corresponding to the determined position of the cooking vessel. In some examples, the controller may be configured to, based on identifying both of the first target coil pattern and the second target coil pattern, move the heating module to a position corresponding to the first target coil pattern. In some examples, the controller may be configured to, based on identifying a plurality of target coil patterns that completely overlap with the cooking vessel among the plurality of coil patterns, move the heating module to a position corresponding to a center of the plurality of target coil patterns.

In some implementations, the controller may be configured to, based on identifying a plurality of target coil patterns that at least partially overlap with the cooking vessel among the plurality of coil patterns, move the heating module to a position corresponding to a center of the plurality of target coil patterns.

In some implementations, the controller may be configured to wirelessly communicate with the inverter and the heating module.

In some implementations, the cooking apparatus may further include a rail connected to the heating module and configured to guide movement of the heating module in the lower space, where the controller may be configured to, based on determining the position of the cooking vessel, move the heating module along the rail.

In some implementations, the cooking apparatus may further include a driver configured to provide power to move the heating module along the rail, the driver comprising at least one of a motor, a wheel, or a gear.

In some implementations, the cooking apparatus may include a first rail that is connected to the heating module, that extends in a first direction, and that is configured to guide movement of the heating module along the first direction, and a second rail that is connected to the first rail, that extends a second direction crossing the first direction, and that is configured to guide movement of the heating module along the second direction. The controller may be configured to, based on determining the position of the cooking vessel, move the heating module along the first rail and move both the heating module and the first rail along the second rail. In some examples, the second rail may be connected to a power supply and configured to transmit electric power from the power supply to the first rail.

DETAILED DESCRIPTION

One or more implementations of a cooking apparatus will be described with reference to the accompanying drawings. The drawings illustrate examples of the present disclosure and are provided to describe the disclosure in detail. Thus, the technical scope of the present disclosure should not be construed as being limited to the implementations and drawings set forth herein.

In the drawings, like reference numerals denote like components, and description of like components is not repeated.

Figure 1:
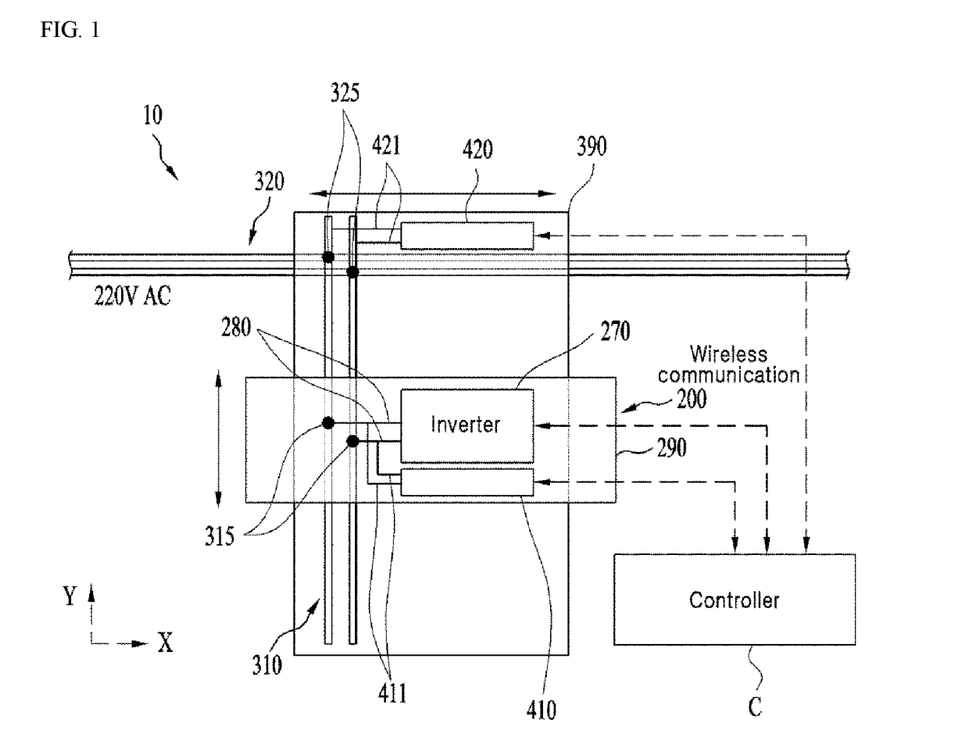
FIG. 1 is a conceptual view illustrating an example of a cooking apparatus.
Figure 2:
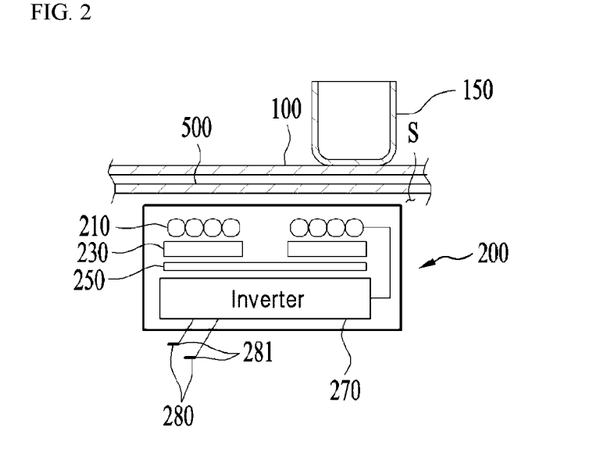
FIG. 2 is a view illustrating an example of a heating module in the cooking apparatus in FIG. 1.

FIG. 1 is a conceptual view illustrating an example of a cooking apparatus, and FIG. 2 is a view illustrating a heating module provided at the cooking apparatus in FIG. 1.

Specifically, FIG. 1 is a schematic plane view illustrating a state in which an upper plate supporting a cooking vessel is omitted, and FIG. 2 is a schematic lateral cross-sectional view illustrating a heating module provided in a space (e.g., a lower space) under the upper plate.

For convenience of description, an X-axis in FIG. 1 may indicate a lengthwise direction of a cooking apparatus, and a Y-axis in FIG. 1 may indicate a widthwise direction of the cooking apparatus.

Referring to FIGS. 1 and 2, a cooking apparatus 10 may be implemented as an induction range configured to heat a cooking vessel by a magnetic field that is generated by electric current supplied to a coil.

The cooking apparatus 10 may include a heating module 200 disposed under an upper plate 100, and one or more rails 310, 320 disposed under the heating module 200.

The upper plate 100 may be made of at least one of glass, marble, ceramics, and wood. A cooking vessel 150 may be disposed on the upper plate 100. That is, the cooking vessel 150 may be supported by the upper plate 100.

In some implementations, the cooking vessel 150 may be made of a material that may be heated by a magnetic field generated in the heating module 200. For example, the cooking vessel 150 may be made of a material to which a magnet is attached (e.g., metal to which a magnet is attached). In some examples, the cooking vessel 150 itself may be heated by the heating module 200, and contents of the cooking vessel 150 may be heated.

The cooking apparatus 10 may be provided with an induction coil where induced current may be generated by a magnetic field of the heating module 200. In some examples, any material may be used as a material of the cooking vessel 150, and induced current generated in the induction coil may be used as energy for heating the inside of the cooking vessel 150.

The heating module 200 may be disposed in a lower space (S) provided under the upper plate 100. The heating module 200 may be movably provided in the space (S). For example, the heating module 200 may be movably provided in the space (S) in the lengthwise direction and the widthwise direction of the cooking apparatus.

The heating module 200 may include a coil 210. The coil 210 may be made of a material including copper. For example, the coil 210 may include a copper wire that is wound multiple times in a circular shape. In some examples, the coil 210 may have a shape in which a copper wire is wound a plurality of times in different radial directions. In some cases, the coil 210 may have a shape in which a copper wire is wound a plurality of times such that a radius of the copper wire is gradually increased.

When electric current is supplied to the coil 210, a magnetic field may be generated. In some examples, the electric current may be alternating current. A cooking vessel 150 disposed above the coil 210 may be heated by the magnetic field generated in the coil 210.

The heating module 200 may include an inverter 270 disposed under the coil 210. The inverter 270 may be configured to convert electric current supplied to the heating module 200 into high-frequency current. In some examples, electric current may be supplied to the inverter 270 from an external power supply, and the inverter 270 may convert electric current supplied by the external power supply into high-frequency current and may supply the high-frequency current to the coil 210.

The inverter 270 is provided at the heating module 200. When the heating module 200 moves, the invert 270 may also move. The inverter 270 may be controlled by a controller (C). For example, the inverter 270 may be controlled by the controller (C) through wireless communication. In some cases, the controller (C) may include an electric circuit, a transmitter, a receiver, or processor.

In some implementations, as the inverter 270 moves together with the coil 210 when the heating module 200 moves, an electric short circuit or an electric disconnection between the inverter 270 and the coil 210 may not occur although the heating module 200 moves.

The heating module 200 may be further provided with a magnetic field-blocking member 250 disposed between the coil 210 and the inverter 270. That is, the coil 210, the magnetic field-blocking member 250 and the inverter 270 may be consecutively disposed in an up-down direction. The magnetic field-blocking member 250 may be configured to block a magnetic field generated in the coil 210 from proceeding to the inverter 270.

For example, the magnetic field-blocking member 250 may be formed into an aluminum plate. The magnetic field-blocking member 250 may help to prevent the inverter 270 from operating incorrectly and from being damaged.

The heating module 200 may include a ferrite core 230 disposed between the coil 210 and the inverter 270. The ferrite core 230 may be disposed between the coil 210 and the magnetic field-blocking member 250.

By the ferrite core 230, a path of a magnetic field generated in the coil 210 may concentrate on a cooking vessel 150 disposed above the coil 210. That is, the ferrite core 230 may concentrate a path of a magnetic field generated in the coil 210 on an upper side of the coil 210, and may magnify intensity of a magnetic field affecting a cooking vessel.

Referring to FIG. 1, the rails 310, 320 may be configured to guide movements of the heating module 200. The rails 310, 320 may be disposed under the heating module 200. For example, the rails 310, 320 may be disposed under the heating module 200 in a space (S) defined vertically below the upper plate 100.

In some implementations, electric current from an external power supply may be supplied to the rails 310, 320. In some examples, the rails 310, 320 may be made of electrically conductive metal. Additionally, the heating module 200 may be supplied with electric current through the rails 310, 320. Accordingly, although the heating module 200 moves in the space (S), a short circuit may not occur between the rail 310, 320 and the heating module 200.

The heating module 200 may be disposed on the rails 310, 320, and the rails 310, 320 may include a first rail 310 electrically connected to the heating module 200. The first rail 310 may be configured to have a predetermined length such that the first rail extends in the widthwise direction (i.e., the Y-axis direction) of the cooking apparatus 10.

The heating module 200 may move on the first rail 310 along extension direction of the first rail 310. When the heating module 200 moves on the first rail 310, an electric connection between the first rail 310 and the heating module 200 may be maintained.

Accordingly, regardless of a position of the heating module 200 on the first rail 310, the heating module 200 may be supplied with electric current from an external power supply through the first rail 310.

In some examples, a pair of the first rails 310 may be provided to supply alternating current to the heating module 200. That is, a pair of first rails 310 may extend in the widthwise direction of the cooking apparatus 10 in parallel with each other.

In some examples, the heating module 200 may be provided with a contact terminal 280 that keeps contacting the first rail 310. A pair of contact terminals 280 may be provided to correspond to the pair of first rails 310. Through the pair of first rails 310 and the pair of contact terminals 280, alternating current may be supplied to the heating module 200.

In some implementations, the pair of first rails 310 and the pair of contact terminals 280 may contact each other at a pair of first contact areas 315. Positions of the pair of first contact areas 315 may vary depending on movements of the heating module 200 on the first rail 310.

One end of the contact terminal 280 may be connected to the inverter 270, and the other end (i.e., a free end) of the contact terminal 280 may contact the first rail 310. Accordingly, electric current from an external power supply may consecutively pass the first rail 310, the contact terminal 280 and the inverter 270 and then may be supplied to the coil 210.

Figure 3:
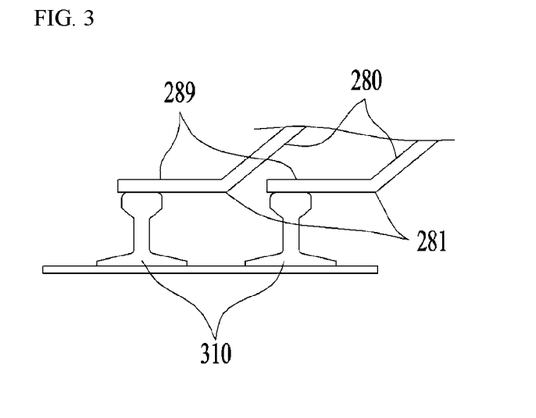
FIG. 3 is a view illustrating an example of an electric connection between a rail and a coil of a heating module.

For example, FIG. 3 is a cross-sectional view illustrating an electric connection between a rail and a coil provided at a heating module.

Referring to FIGS. 1 and 3, a pair of first rails 310 may be spaced apart from each other and may be disposed in parallel with each other. The first rail 310 may have a shape in which a surface area of its upper end is smaller than a surface area of its lower end, and the contact terminal 280 may contact the upper end. Accordingly, a short circuit may not occur between the first rail 310 and the contact terminal 280.

In some examples, the first rail 310 and the inverter 270 may be electrically connected by the contact terminal 280.

For instance, the free end 289 of the contact terminal 280 may contact the upper end of the first rail 310. In some examples, the contact terminal 280 may be provided with a bent portion 281 such that the free end 289 elastically contacts the upper end of the first rail 310.

In some implementations, the bent portion 281 may be disposed at the first rail 310, and the free end of the first rail

310 may elastically contact the upper end of the first rail 310. The bent portion 281 may be disposed closer to the other end of the contact terminal 280 than to one end of the contact terminal 280. In some examples, the bent portion 281 may be disposed near the free end 289 of the contact terminal 280.

Accordingly, the free end of the contact terminal 280 is pressed downwards on the first rail 310 against the first rail 310, and a contact force between the first rail 310 and the contact terminal 280 may be increased.

Referring back to FIGS. 1 and 2, the rails 310, 320 may further include a second rail 320 that is orthogonal to the first rail 310. The second rail 320 may be electrically connected to the first rail 310.

The first rail 310 may move in a direction in which the second rail 320 extends while maintaining the electric connection with the second rail 320. That is, the second rail 320 may be configured to extend in a predetermined length in the lengthwise direction (i.e., the X-axis direction) of the cooking apparatus 10.

Additionally, the first rail 310 may be configured to move on the second rail 320 along extension direction of the second rail 320. In some examples, while the first rail 310 is moved on the second rail 320, the electric connection between the first rail 310 and the second rail 320 may be maintained.

In some implementations, a pair of second rails 320 may be provided to correspond to the pair of first rails 310. The pair of first rails 310 and the pair of second rails 320 may contact each other at a pair of second contact areas 325. Positions of the pair of second contact areas 325 may vary depending on movements of the first rail 310 on the second rail 320.

When electric current is supplied to any one of the first rail 310 and the second rail 320 from an external power supply, the electric current may also be supplied to the other rail. That is, as the first rail 310 and the second rail 320 are electrically connected, a degree of freedom of an electric connection through the external power supply may be increased.

In some examples, the external power supply may be electrically connected to the second rail 320, and the first rail 310 may receive electric current through the second rail 320, as the first rail 310 may move on the second rail 320 along extension direction of the second rail 320.

That is, the first rail 310 may move and the second rail 320 may be fixed to a predetermined position. For example, the second rail 320 may be disposed at one side in the widthwise direction of the space (S).

When an external power supply is connected to the movable first rail 310 directly and electrically, an electric short circuit or an electric disconnection may occur between the external power supply and the first rail 310. In some examples, an external power supply is connected to the fixed second rail 320, and the first rail 310 is supplied with electric current through the second rail 320.

That is, as the external power supply may be connected to the second rail 320 directly and electrically, the electric current from the external power supply may pass the second rail 320, the first rail 310, the contact terminal 280 and the inverter 270 consecutively and then may be supplied to the coil 210.

In some implementations, the cooking apparatus 10 may further include one or more drivers or driving devices. For example, the cooking apparatus 10 may further include one or more moving tools 410, 420 for moving the heating module 200. In some examples, the moving tools 410 and 420 may include at least one of a wheel, a motor, a gear and a hydraulic cylinder, or any combinations thereof.

The moving tools 410, 420 may include a first moving tool 410 for moving the heating module 200 on the first rail 310, and a second moving tool 420 for moving the second rail 320 on the second rail 320.

The first moving tool 410 may be configured to supply power for moving the heating module 200 on the first rail 310. Additionally, the second moving tool 420 may be configured to supply power for moving the second rail 320 on the second rail 320.

In some implementations, the first moving tool 410 may be provided at the heating module 200 or may be spaced apart from the heating module 200. In some examples, the first moving tool 410 is provided at the heating module 200 to avoid interference when the heating module 200 moves.

In some examples, the second moving tool 420 is also disposed at a position where interference may be minimized when the heating module 200 moves. The second moving tool 420 may be disposed at one side of the second rail 320.

For example, the second rail 320 and the second moving tool 420 may all be disposed at one side of the cooking apparatus 10 in the widthwise direction thereof. Additionally, the second moving tool 420 may be disposed to lean further towards at one side of the cooking apparatus 10 in the widthwise direction thereof than the second rail 320. Accordingly, interference between the second moving tool 420 and the heating module 200 may be avoided.

The heating module 200 may be disposed on a first support bracket 290. The first support bracket 290 may have a length greater than a width and may be disposed on a second support bracket 390 at which the first rail 310 is disposed. The second support bracket 390 may extend along extension direction of the first rail 310. The second support bracket 390 may have a width greater than a length.

The first support bracket 290 may make relative movements with respect to the second support bracket 390 by the first moving tool 410. That is, the first support bracket 290 may be moved along extension direction of the second support bracket 390 by the first moving tool 410. For example, the first support bracket 290 may be slid on the second support bracket 390 by the first moving tool 410.

The second support bracket 390 may make relative movements with respect to the second rail 320 by the second moving tool 420. That is, the second support bracket 390 may be moved along extension direction of the second rail 320 by the second moving tool 420. For example, the second rail 320 may be disposed at a bottom surface of the space (S) provided under the upper plate 100, and the second support bracket 390 may be slid on the second rail 320 by the second moving tool 420.

The first rail 310 and the second moving tool 420 may be disposed at the second support bracket 390. Additionally, the second rail 320 may be disposed to cross the second support bracket 390 in the lengthwise direction (the X-axis direction) under the second support bracket 390.

The moving tools 410, 420 may be supplied with electric current through at least one of the first rail 310 and the second rail 320. For example, the first moving tool 410 and the second moving tool 420 may be electrically connected with the first rail 310 or the second rail 320 and may be supplied with electric current. Accordingly, a wire for supplying electric current to the first rail 310 and the second rail 320 may be simply implemented.

In some implementations, the first moving tool 410 and the second moving tool 420 may all be supplied with electric current through the first rail 310.

Specifically, a first connection wire 411 may be provided between the first moving tool 410 and the contact terminal 280, and the first moving tool 410 may be supplied with electric current through the first connection wire 411.

A second connection wire 421 may be provided between the second moving tool 420 and the first rail 310, and the second moving tool 420 may be supplied with electric current through the second connection wire 421.

For example, the second connection wire 421 may be disposed to connect one end of the first rail 310 in a lengthwise direction thereof and the second moving tool 420. One end of the first rail 310 in the lengthwise direction thereof may be one of both ends of the first rail 310 in the lengthwise direction thereof, which is relatively close to the second moving tool 420.

Through the arrangement of the first connection wire 411 and the second connection wire 421, interference with the heating module 200 may be avoided, and, using a minimum length of the connection wire, electric current may be supplied to the first moving tool 410 and the second moving tool 420.

The cooking apparatus 10 may further include a substrate 500 disposed between the upper plate 100 and the heating module 200. The substrate 500 may be formed into a printed circuit board. A plurality of coil patterns may be printed on the substrate 500. For example, the plurality of coil patterns may be printed with a copper material. Through the substrate 500, a position of a cooking vessel disposed on the cooking apparatus 10 may be determined. Detailed description in relation to this is provided hereunder with reference to another drawing.

An example of an electric connection between example components of the cooking apparatus 10 is described below with reference to another drawing.

Figure 4:
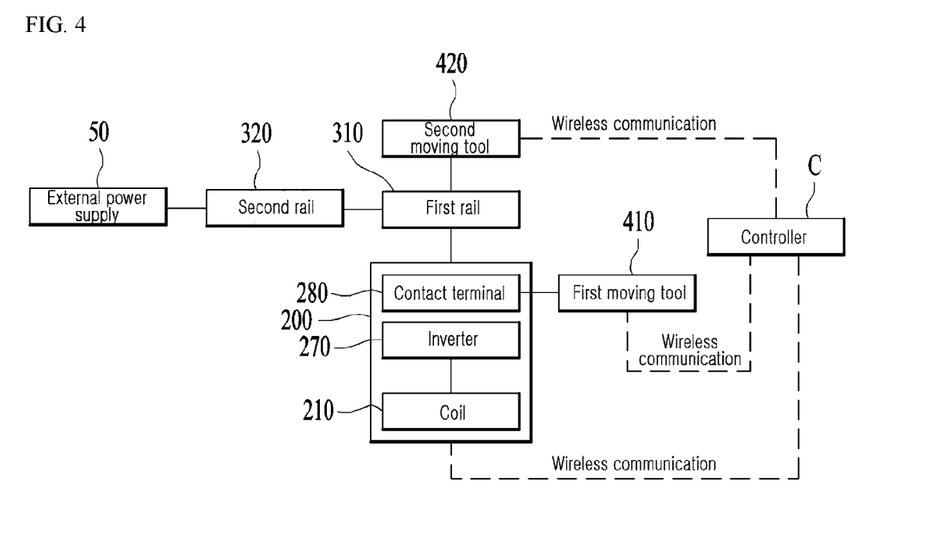
FIG. 4 is a view illustrating example components of the cooking apparatus and an example connection between the components.

FIG. 4 is a view illustrating an example of a connection between example components.

Referring to FIG. 4, the second rail 320 may be electrically connected to an external power supply 50. That is, the second rail 320 may be connected to the external power supply 50 directly and electrically.

The second rail 320 may be electrically connected to the first rail 310. Accordingly, electric current from the external power supply 50 may be supplied to the first rail 310 through the second rail 320.

The first rail 310 may be electrically connected respectively to the heating module 200, the first moving tool 410 and the second moving tool 420.

In some examples, the first rail 310 and the second moving tool 420 may be connected directly and electrically to each other. The first rail 310 and the heating module 200 may also be connected directly and electrically to each other.

Additionally, the first rail 310 and the first moving tool 410 may be electrically connected through the contact terminal 280 provided at the heating module 200.

The heating module 200, the first moving tool 410 and the second moving tool 420 may be controlled by the controller (C). For example, the heating module 200, the first moving tool 410 and the second moving tool 420 may communicate with the controller (C) using a wireless communication method.

The heating module 200, the first moving tool 410 and the second moving tool 420 may be provided respectively with a communication module to communicate with the controller (C), and the controller (C) may also be provided with a communication module.

The heating module 200, the first moving tool 410 and the second moving tool 420 may be controlled by the controller (C) through wireless communication. Accordingly, interference between the heating module 200 and a communication wire caused by movements of the heating module 200 may be avoided through control by the controller using wireless communication better than through control by the controller using the communication wire.

Electric current from the external power supply 50, as described above, may pass the second rail 320 and the first rail 310 consecutively and may be respectively supplied to the second moving tool 420 and the heating module 200. Further, electric current supplied to the heating module 200 may be supplied to the first moving tool 410 through the contact terminal 280 provided at the heating module 200.

The cooking apparatus 10 may include a plurality of vibration sensors (510, 520, 530 and 540) provided at the upper plate 100. The plurality of vibration sensors (510, 520, 530 and 540) may include four vibration sensors (i.e., a first vibration sensor 510, a second vibration sensor 520, a third vibration sensor 530, and a fourth vibration sensor 540).

The controller (C) may be electrically connected to the plurality of vibration sensors (510, 520, 530 and 540) and may control the plurality of vibration sensors (510, 520, 530 and 540).

That is, the controller (C) may receive a signal from the plurality of vibration sensors (510, 520, 530 and 540). The plurality of vibration sensors (510, 520, 530 and 540) may be configured to sense vibration and to output a signal based on magnitude of vibration.

In some examples, a signal from the plurality of vibration sensors (510, 520, 530 and 540) may denote an output voltage of the plurality of vibration sensors (510, 520, 530 and 540). For example, each of the plurality of vibration sensors (510, 520, 530 and 540) may be configured such that intensity of a signal (magnitude of an output voltage) is increased as magnitude of vibration is increased.

The controller (C) may determine a position of a cooking vessel disposed on the upper plate 100 based on a signal from the plurality of vibration sensors (510, 520, 530 and 540).

That is, the heating module 200 may change a position based on a position of a cooking vessel. In other words, the heating module 200 has to change its position to be disposed under a cooking vessel. Accordingly, a position of a cooking vessel needs to be determined before the heating module 200 is moved.

An example configuration for determining a position of a cooking vessel disposed on the upper plate is described with reference to another drawing.

Figure 5A:
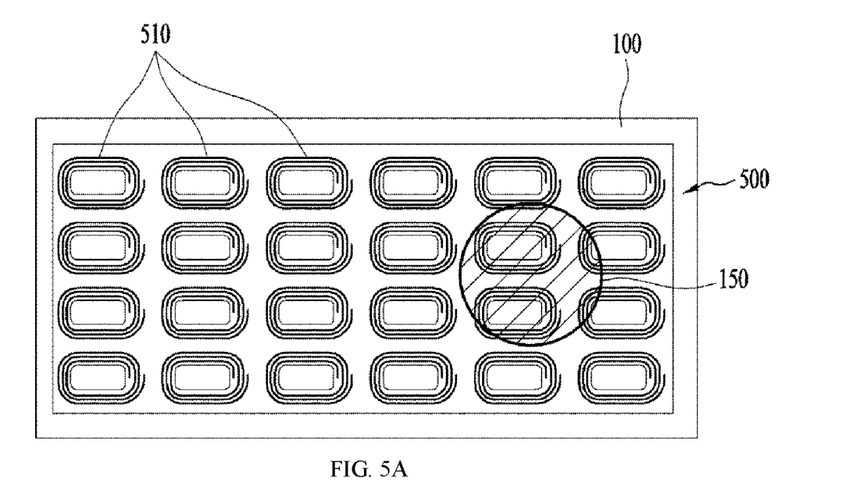
FIGS. 5A and 5B are views illustrating an example of a substrate configured to detect a position of a cooking vessel.
Figure 5B:
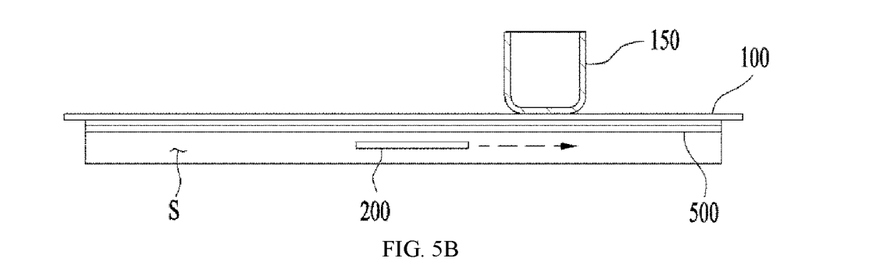

FIGS. 5A and 5B are views illustrating an example substrate configured to determine a position of a cooking vessel. Specifically, FIG. 5A is a plane view showing an example substrate on which a plurality of coil patterns are printed, and FIG. 5B is a conceptual view illustrating an example of an arrangement relation of an upper plate, a substrate, and a heating module.

Referring to FIGS. 5A and 5B, the substrate 500 may be disposed between the upper plate 100 and the heating module 200. The substrate 500 may be disposed above the heating module 200 in the space (S) provided under the upper plate 100.

A plurality of coil patterns 510 may be printed on the substrate 500. The plurality of coil patterns 510 may all be formed into the same shape and size. Using the plurality of coil patterns 510 printed on the substrate 500, a position of a cooking vessel 150 may be determined.

That is, when electric current is supplied to the heating module 200, a cooking vessel 150 disposed above the heating module 200 may be heated, or induced current may be generated in an induction coil inside the cooking vessel 150. When a cooking vessel 150 is made of metal, the cooking vessel 150 itself may be heated by the heating module 200. When electric current is supplied to the heating module 200 in case that an induction coil is disposed in a cooking vessel 150, induced current may be generated in the induction coil. In case that an induction coil is disposed in a cooking vessel 150, an exterior of the cooking vessel 150 may be made of a resin material. In some examples, induced current generated in the induction coil may be used as energy for operation the cooking vessel 150.

When electric current is supplied to the substrate 500, a position of a cooking vessel 150 may be determined. The electric current supplied to the substrate 500, which are used to determine a position of a cooking vessel 150, may be smaller than electric current supplied to the heating module 200. Additionally, supplying electric current to the substrate 500 may denote supplying electric current to the plurality of coil patterns 510 printed on the substrate 500.

For example, when a cooking vessel 150 is made of metal, the cooking vessel 150 may be a load of a magnetic field generated in the heating module 200. Accordingly, the number of pulses output during a predetermined period from a specific coil pattern disposed at a position where the cooking vessel 150 is disposed may be fewer than the number of pulses output from another coil pattern. For example, the predetermined period may be 200 microseconds.

In some examples, where an induction coil is disposed in a cooking vessel 150, a frequency of a pulse output from a specific coil pattern disposed at a position corresponding to the cooking vessel 150 may be lower than a frequency of a pulse output from another coil pattern.

In some implementations, a position of a cooking vessel 150 disposed above the substrate 500 may be determined. Detailed description in relation to this is provided hereunder with further reference to another drawing.

The substrate 500 may be sized to cover the space (S) provided under the upper plate 100. That is, an upper end of the space (S) may be completely covered with the substrate 500. This is to determine any position where a cooking vessel 150 is disposed in a range in which the heating module 200 may move.

When the plurality of coil patterns 510 are disposed on a lower surface of the substrate, the movable heating module 200 may interfere with the plurality of coil patterns 510. Accordingly, the plurality of coil patterns 510 may be disposed on an upper surface of the substrate 500.

Further, the plurality of coil patterns 510 may be disposed to form a plurality of rows and a plurality of columns at predetermined intervals on the substrate 500. This is to determine a position of a cooking vessel 150 accurately through a comparison of the number and frequency of pulses output from each coil pattern.

When electric current is supplied to the substrate 500 in a state in which a cooking vessel 150 is disposed on the upper plate 100, a position of the cooking vessel 150 may be determined, and, based on the determined position of the cooking vessel 150, the heating module 200 may move to a lower side of the cooking vessel 150.

An example of a method of determining a position of a cooking vessel 150 through the substrate 500 is described below with reference to another drawing.

Figure 6:
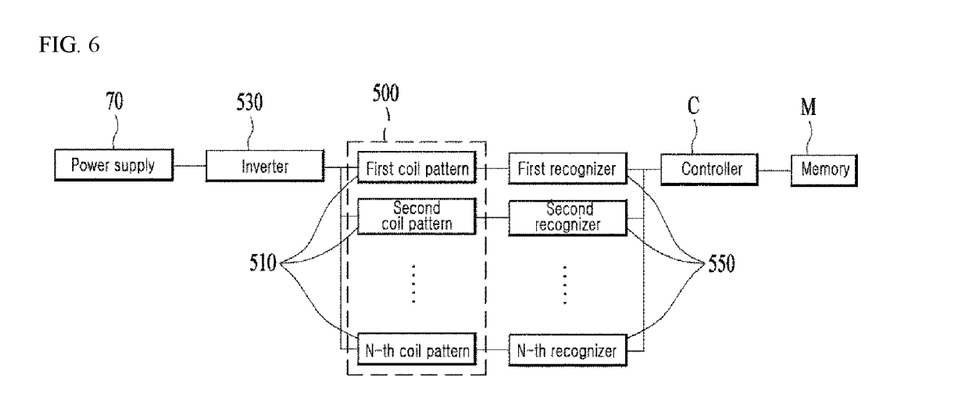
FIG. 6 is a view illustrating an example connection between example components configured to determine a position of a cooking vessel.

FIG. 6 is a view illustrating an example of a connection between example components for determining a position of a cooking vessel.

Referring to FIG. 6, the cooking apparatus 10 may further include an inverter 530 that supplies resonance current to the substrate 500. That is, the inverter 530 may be configured to supply resonance current to each of the plurality of coil patterns 510 provided on the substrate 500.

The cooking apparatus 10 may further include a power supply 70 that supplies power to the inverter 530. That is, the inverter 530 may receive a predetermined voltage through the power supply 70.

The inverter 530 may supply a voltage lower than a voltage supplied to the heating module 200 to each of the plurality of coil patterns 510. For example, a voltage of 40 to 60 V may be supplied to each of the plurality of coil patterns 510 by the inverter 530. In some examples, a voltage of 50 V may be supplied to each of the plurality of coil patterns 510.

The controller (C) may determine a position of a cooking vessel 150 on the upper plate 100 based on the number of pulses of resonance current supplied to each of the plurality of coil patterns 510 or frequency of resonance current supplied to each of the plurality of coil patterns 510.

According to the present disclosure, using a substrate 500 that is easily manufactured and is cost-effective, a position of a cooking vessel 150 may be determined accurately and readily.

The inverter 530 may generate a one-shot pulse in the plurality of coil patterns 510 in a predetermined cycle. That is, the controller (C) may control the inverter 530 such that the inverter 530 generates a one-shot pulse in the plurality of coil patterns 510 in a predetermined cycle until a position of a cooking vessel 150 is determined.

The inverter 530 may generate a one-shot pulse in the plurality of coil patterns 510 at the same time. Accordingly, the number or frequency of pulses output from the plurality of coil patterns 510 may be compared under the same conditions.

The cooking apparatus 10 may further include a recognizer 550 configured to recognize at least one of the number and frequency of pulses output from the plurality of coil patterns 510. A plurality of recognizers 550 may be provided. Additionally, the same number of recognizers may be provided as the number of the plurality of coil patterns 510. That is, each of the plurality of recognizers 550 may correspond to each of the plurality of coil patterns 510 (e.g., on a one-to-one basis). For example, the recognizers 550 may be or include sensors or electric circuits. In some cases, the plurality of coil patterns 510 or the plurality of recognizers 550 may be vibration sensors.

Accordingly, the number and frequency of pulses output from each coil pattern 510 during a predetermined period may be sensed more accurately and immediately.

Specifically, the controller (C) may be electrically connect to the plurality of recognizers 550 and may receive information on the number and frequency of pulses generated in each coil pattern 510. Based on the information, the controller (C) may determine a target coil pattern corresponding to a position where a cooking vessel 150 is disposed among the plurality of coil patterns 510. The target coil pattern may be one or more specific coil patterns that indicate a position where a cooking vessel 150 is disposed among the plurality of coil patterns 510.

For example, in case that a cooking vessel 150 is made of metal, the number of pulses output from a target coil pattern during a predetermined period among the plurality of coil patterns 510 may differ from the number of pulses output from the other coil patterns.

In case a cooking vessel 150 is provided with an induction coil, a frequency output from a target coil pattern among the plurality of coil patterns 510 may differ from a frequency output from the other coil patterns.

The controller (C), as described above, may determine a position of a cooking vessel 150 based on the number and frequency of pulses output from each of the plurality of coil patterns 510 during a predetermined period.

Further, through a comparison of the number and frequency of pulses during a predetermined period, the controller (C) may determine the type of a cooking vessel 150. That is, in case that a position of a cooking vessel 150 is identified through a comparison of the number of pulses during a predetermined period, the cooking vessel 150 is made of metal. In case that a position of a cooking vessel 150 is identified through a comparison of frequencies, the cooking vessel 150 is provided with an induction coil.

Certainly, information on a position of each of the plurality of coil patterns 510 may be determined through an experiment and may be pre-stored in a memory (M) electrically connected to the controller (C). For example, position information corresponding to each coil pattern 510 may be stored in the memory (M).

That is, the controller (C) may receive information on a position of the target coil pattern through the memory (M) in which position information on each of the plurality of coil patterns 510 is stored. Additionally, the controller (C) may determine a position of a cooking vessel 150 based on the information on a position of the target coil pattern. Accordingly, based on the position information on the plurality of coil patterns 510, a position of a cooking vessel 150 may be readily determined.

The target coil pattern may include a first target coil pattern completely overlapping a lower side of a cooking vessel 150, and a second target coil partially overlapping the lower side of the cooking vessel 150.

That is, among the plurality of coil patterns 510, a coil pattern disposed to completely overlap a lower surface or an induction coil of a cooking vessel 150 under the cooking vessel 150 may be the first target coil pattern, while, among the plurality of coil patterns 510, a coil pattern disposed to partially overlap a lower surface or an induction coil of a cooking vessel 150 under the cooking vessel 150 may be the second target coil pattern.

Additionally, the number and frequency of pulses in the first target coil pattern during a predetermined period may be different from the number and frequency of pulses in the second target coil pattern during a predetermined period. That is, the number of pulses output from the first target coil pattern and the second target coil pattern during a predetermined period may differ. Further, frequencies output from the first target coil pattern and the second target coil pattern may differ.

As described above, as the target coil pattern may be divided into the first target coil pattern and the second target coil pattern, a position of a cooking vessel 150 may be determined more accurately.

In some cases, when a cooking vessel 150 is not disposed on the upper plate 100, the number of pulses of resonance current recognized by all the plurality of recognizers 550 may be more than a first predetermined reference number, and a frequency of the resonance current may be a first predetermined reference frequency.

In some examples, where a cooking vessel 150 is made of metal, the number of pulses of resonance current recognized by all the plurality of recognizers 550 may be more than a first predetermined reference number. In some cases, where a cooking vessel 150 includes an induction coil, a frequency of resonance current recognized by all the plurality of recognizers 550 may be a first predetermined reference frequency.

In some implementations, when the number of pulses of resonance current recognized by all the plurality of recognizers 550 is more than a first predetermined reference number and a frequency of the resonance current is a first predetermined reference frequency, the controller (C) may determine that a cooking vessel 150 is not disposed on the upper plate 100.

In some examples, where a cooking vessel 150 made of metal is disposed on the upper plate 100, the number of pulses of resonance current output from one or more specific coil patterns that at least partially overlap a position of the cooking vessel 150 among the plurality of coil patterns 510 may be fewer than the first reference number.

In some implementations, the controller (C) may determine that a coil pattern, where the number of pulses of resonance current is fewer than the first reference number and is more than a second predetermined reference number fewer than the first reference number, is a second target coil pattern. Further, the controller (C) may determine that a coil pattern, where the number of pulses of resonance current is fewer than the second reference number, is the first target coil pattern. For example, the first reference number may be four to five, and the second reference number may be one to two.

In some examples, where a cooking vessel 150 including an induction coil is disposed on the upper plate 100, a frequency of resonance current output from one or more specific coil patterns that at least partially overlap a position of the cooking vessel 150 among the plurality of coil patterns 510 may be lower than a first reference frequency.

In some implementations, the controller (C) may determine that a coil pattern, where a frequency of resonance current is lower than the first reference frequency and is higher than a second reference frequency lower than the first reference frequency, is a second target coil pattern. Further, the controller (C) may determine that a coil pattern, where a frequency of resonance current is lower than the second reference frequency, is a first target coil pattern.

In some implementations, presence of a cooking vessel 150 on the upper plate 100 and a position of a cooking vessel 150 may be determined based on the number and frequency of pulses output from the plurality of coil patterns 510 and detected by each of the plurality of recognizers 550. In some examples, the controller (C) may determine whether a cooking vessel 150 is made of metal or includes an induction coil.

After the position of the cooking vessel 150 is determined, the controller (C) may move the heating module 200 to a position corresponding to the position of the cooking vessel 150. That is, the controller (C) may move the heating module 200 to a lower side of the cooking vessel based on the determined position of the cooking vessel 150.

In some implementations, even when the user disposes a cooking vessel 150 at any position on the upper plate 100, a position of the heating module 200 for heating the cooking vessel 150 or for generating induced current in an induction coil provided at the cooking vessel 150 may be automatically adjusted.

Specifically, the first target coil pattern and the second target coil pattern may be sensed at the same time. In some examples, position information on the first target coil pattern disposed to completely overlap a cooking vessel 150 may be used to determine a position of the cooking vessel 150.

In some examples, when the first target coil pattern and the second target coil pattern are sensed at the same time, the controller (C) may move the heating module 200 based on a position of the first target coil pattern.

In some examples, to determine the position of the cooking vessel 150 more accurately, the controller (C) may use position information on the second target coil pattern for reference. For example, in case that a single first target coil pattern and a plurality of second target coil patterns are sensed at the same time, a position of a cooking vessel 150 may be determined considering position information on the first target coil pattern and position information on the center of the plurality of second target coil patterns.

In some implementations, where a size of a cooking vessel 150 is relatively large, a plurality of first target coil patterns may be sensed. In some cases, the controller (C) may sense only the plurality of first target coil patterns.

In some implementations, when the plurality of first target coil patterns are sensed, the controller (C) may move the heating module 200 based on a position corresponding to the center of the plurality of first target coil patterns.

Further, a size of a cooking vessel 150 may be relatively small, and the cooking vessel 150 may be disposed between adjacent coil patterns. In some examples, a plurality of second target coil patterns may be sensed. That is, the controller (C) may sense only the plurality of second target coil patterns.

In some implementations, when the plurality of second target coil patterns are sensed, the controller (C) may move the heating module 200 based on a position corresponding to the center of the plurality of second target coil patterns.

The present disclosure, as described above, may determine a position of a cooking vessel 150 on the upper plate 100 accurately and rapidly using the plurality of coil patterns 510 that are arranged in a plurality of rows and in a plurality of columns on the substrate 500.

The present disclosure has been described with reference to the example implementations illustrated in the drawings. Further, the disclosure may be modified in various different forms by one having ordinary skill in the art to which the disclosure pertains within the technical spirit and scope of the disclosure defined in the appended claims. Thus, modifications made to the implementations of the disclosure should be included in the present disclosure.

The invention claimed is:

1. A cooking apparatus, comprising:
an upper plate configured to support a cooking vessel;
a heating module that is disposed in a lower space defined vertically below the upper plate and that is configured to move in the lower space relative to the upper plate, the heating module including a coil;
a substrate disposed between the upper plate and the heating module, the substrate including a plurality of coil patterns;
an inverter configured to cause resonance current to be supplied to each of the plurality of coil patterns; and
a controller configured to:
control the heating module, the plurality of coil patterns, and the inverter,
determine a position of the cooking vessel on the upper plate based on (i) a number of pulses of the resonance current supplied to each of the plurality of coil patterns or (ii) frequencies of the resonance current,
when the position of the cooking vessel is identified through a comparison of the number of pulses, determine that the cooking vessel is made of metal, and
when the position of the cooking vessel is identified through a comparison of the frequencies, determine that the cooking vessel includes an induction coil.

2. The cooking apparatus of claim 1, wherein the substrate covers an upper end of the lower space.

3. The cooking apparatus of claim 1, wherein the plurality of coil patterns are disposed on the substrate, spaced apart from one another by predetermined intervals, and arranged along a plurality of rows and a plurality of columns.

4. The cooking apparatus of claim 3, wherein the controller is configured to control the inverter to repeatedly generate a one-shot pulse in each of the plurality of coil patterns based on a predetermined cycle until the position of the cooking vessel is determined.

5. The cooking apparatus of claim 4, further comprising:
a plurality of sensors, each of the plurality of sensors being connected to one of the plurality of coil patterns and configured to detect the number of pulses and the frequency of the resonance current generated in the one of the plurality of coil patterns.

6. The cooking apparatus of claim 5, wherein the controller is configured to:
electrically connect to each of the plurality of sensors and receive pulse information including the number of the pulses and the frequency of the resonance current generated from each of the plurality of sensors; and
based on the pulse information, determine a target coil pattern corresponding to the position of the cooking vessel among the plurality of coil patterns.

7. The cooking apparatus of claim 6, wherein the controller is configured to:
receive target position information corresponding to a position of the target coil pattern from a non-transitory memory device, the non-transitory memory device being configured to store position information corresponding to each of the plurality of coil patterns; and
determine the position of the cooking vessel based on the target position information.

8. The cooking apparatus of claim 6, wherein the controller is configured to:
based on the cooking vessel overlapping with a first area on the upper plate corresponding to a first target coil pattern among the plurality of coil patterns and a second area on the upper plate corresponding to a second target coil pattern among the plurality of coil patterns, determine the position of the cooking vessel based on a difference in the number of the pulses or the frequencies of the resonance current generated from the first target coil pattern and the second target coil pattern, and
wherein the first area is greater than the second area.

9. The cooking apparatus of claim 8, wherein the controller is configured to:
based on (i) the number of pulses detected by each of the plurality of sensors being greater than a first reference number and (ii) the frequency of the resonance current corresponding to a first reference frequency, determine that no cooking vessel is disposed on the upper plate.

10. The cooking apparatus of claim 9, wherein the controller is configured to:
based on a number of pulses generated from a coil pattern among the plurality of coil patterns being between the first reference number and a second reference number that is less than the first reference number, determine the coil pattern as the second target coil pattern; and based on the number of pulses generated from the coil pattern being less than the second reference number, determine the coil pattern as the first target coil pattern.

11. The cooking apparatus of claim 9, wherein the controller is configured to:
based on a frequency of resonance current generated from a coil pattern among the plurality of coil patterns being between the first reference frequency and a second reference frequency that is less than the first reference frequency, determine the coil pattern as the second target coil pattern; and
based on the frequency of the resonance current generated from the coil pattern being less than the second reference frequency, determine the coil pattern as the first target coil pattern.

12. The cooking apparatus of claim 8, wherein the controller is configured to move the heating module to a lower side of the cooking vessel corresponding to the determined position of the cooking vessel.

13. The cooking apparatus of claim 12, wherein the controller is configured to, based on identifying both of the first target coil pattern and the second target coil pattern, move the heating module to a position corresponding to the first target coil pattern.

14. The cooking apparatus of claim 12, wherein the controller is configured to, based on identifying a plurality of target coil patterns that completely overlap with the cooking vessel among the plurality of coil patterns, move the heating module to a position corresponding to a center of the plurality of target coil patterns.

15. The cooking apparatus of claim 12, wherein the controller is configured to, based on identifying a plurality of target coil patterns that at least partially overlap with the cooking vessel among the plurality of coil patterns, move the heating module to a position corresponding to a center of the plurality of target coil patterns.

16. The cooking apparatus of claim 1, wherein the controller is configured to wirelessly communicate with the inverter and the heating module.

17. The cooking apparatus of claim 1, further comprising a rail connected to the heating module and configured to guide movement of the heating module in the lower space,
wherein the controller is configured to, based on determining the position of the cooking vessel, move the heating module along the rail.

18. The cooking apparatus of claim 17, further comprising a driver configured to provide power to move the heating module along the rail, the driver comprising at least one of a motor, a wheel, or a gear.

19. The cooking apparatus of claim 1, further comprising:
a first rail that is connected to the heating module, that extends in a first direction, and that is configured to guide movement of the heating module along the first direction; and
a second rail that is connected to the first rail, that extends a second direction crossing the first direction, and that is configured to guide movement of the heating module along the second direction,
wherein the controller is configured to, based on determining the position of the cooking vessel, move the heating module along the first rail and move both the heating module and the first rail along the second rail.

20. The cooking apparatus of claim 19, wherein the second rail is connected to a power supply and configured to transmit electric power from the power supply to the first rail.

* * * * *